Oct. 4, 1932.  R. BEYNON  1,880,700
CHANNEL STRIP
Filed Sept. 12, 1930
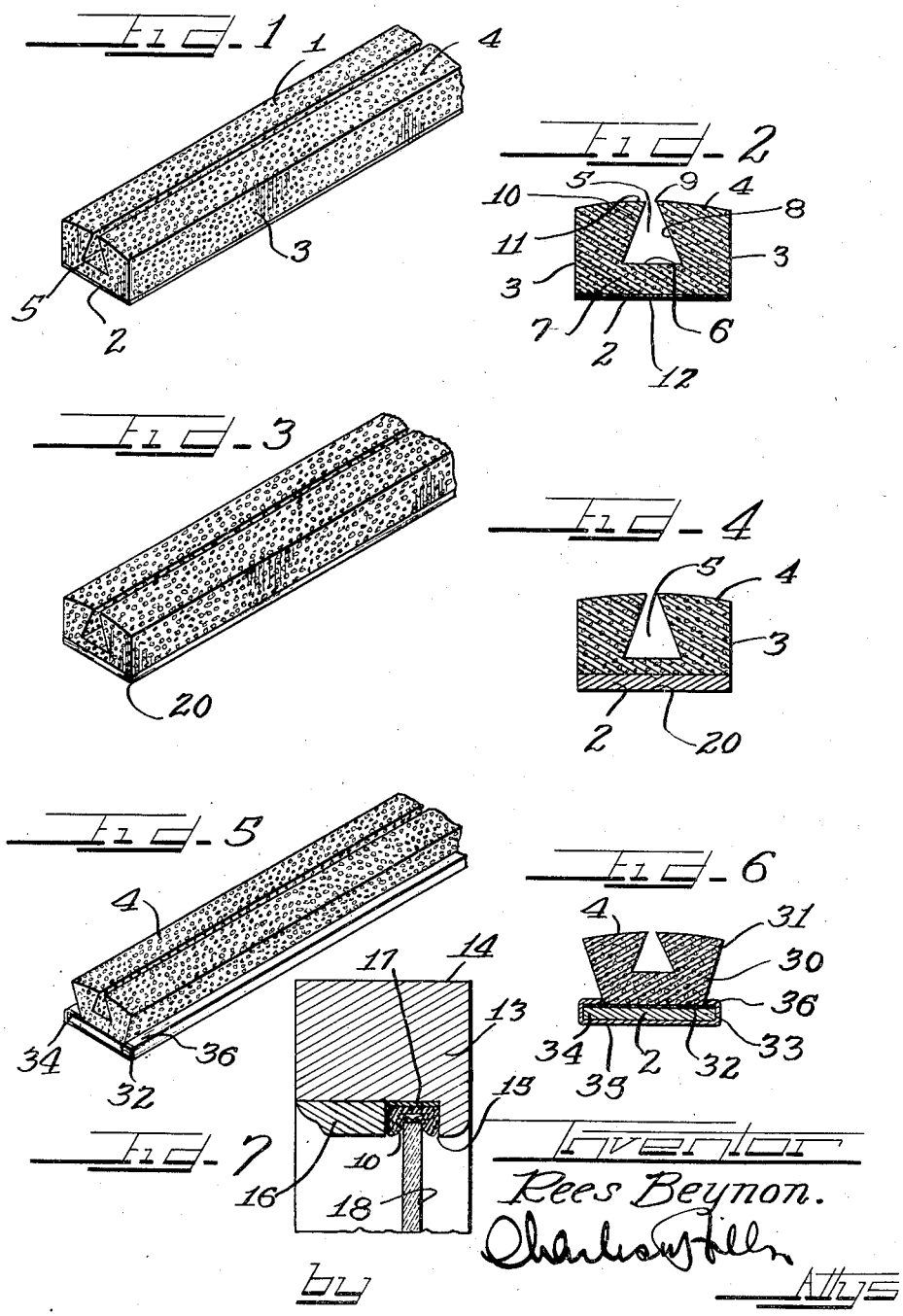

Patented Oct. 4, 1932

1,880,700

UNITED STATES PATENT OFFICE

REES BEYNON, OF CHICAGO, ILLINOIS, ASSIGNOR TO DRYDEN RUBBER COMPANY, OF CHICAGO, ILLINOIS, A CORPORATION OF ILLINOIS

CHANNEL STRIP

Application filed September 12, 1930. Serial No. 481,421.

This invention relates to an improved cushioning member in the form of a channel strip having special utility in connection with vehicle windows for cushioning the impact of a slidable window panel against its frame and for sealing the joints between these members.

Many forms of these cushioning members have come into use in recent years but most of these known strips are not entirely satisfactory for one reason or another. For instance, if the strip is formed of a material of insufficient flexibility to properly cushion the impact of the window panel against its frame and provide a weather tight seal therebetween, its flexibility renders it difficult to handle in securing the strip in place. Decreasing the flexibility of the strip on the other hand, reduces the tenacity with which the strip grips the edge of the window panel, thereby lessening the weather-tightness of the joint.

I have now constructed a cushioning device for use as a header strip which overcomes to a large extent the objectionable features of known devices of this kind.

My device is not, moreover, limited in its application to vehicle windows but may conveniently and advantageously be employed wherever it is desired to seal a joint between the mating surfaces of a pair of members.

It is accordingly an object of this invention to provide a cushioning device from a highly compressible material which will effectively seal and render weather-tight a joint between a pair of mating surfaces.

It is a further object of this invention to provide a header strip for effectively sealing the joints between a vehicle window panel and frame, which is so constructed as to tightly grip the edge of the window panel and at the same time permit its secure attachment to the window frame.

Other and further important objects of this invention will become apparent from the following description and appended claims.

Referring now to the drawing which discloses various embodiments of my invention:

Figure 1 is an isometric view of one form of my cushioning device.

Figure 2 is a cross sectional view of Figure 1.

Figure 3 is an isometric view of a modified form of cushioning device.

Figure 4 is a cross sectional view of the device of Figure 3.

Figure 5 is an isometric view of a further modified form of my device.

Figure 6 is a cross sectional view of the device of Figure 5.

Figure 7 is a sectional view through a vehicle door showing the application of my improved strip to the window frame thereof.

My improved cushioning and sealing device, according to Figures 1 and 2, comprises an elongated header strip 1 of a soft, highly compressible material, preferably molded sponge rubber. Said strip has plane back and side surfaces 2 and 3, respectively, and a slightly convex or dome-shaped front surface 4. A groove or channel 5 of open triangular cross section extends longitudinally through said strip with the base 6 of said channel parallel to and spaced above said back surface 2 to form a relatively fixed back wall 7. The sides 8 of said channel converge toward the front surface 4 of said strip to produce therein a narrow slot 9 leading into said channel. The acute angle which said sides 8 make with the curved front surface 4 of said strip forms with said front surface ledges 10 overhanging said channel 5 and tapering to sharp edges 11 defining said slot 9. The curvature of the front surface 4 of said strip increases the acuteness of said edges 11 and also aids in the sealing action of the strip 1 as will be later explained.

The flexible sealing strip 1 is preferably cemented to the member to which it is applied. Sponge rubber however does not have the necessary strength, rigidity or structure to form a strong joint with an adhesive and accordingly a thin layer 12 of a suitable fibrous material is vulcanized to the back surface 2 of said strip to provide a surface for cementing the strip in place.

Preferably my improved strip 1 is employed in the upper stile 13 of a vehicle window frame 14 as shown in Figure 4. Said stile 13 is rabbeted at 15 to provide in conjunction with the molding 16 a groove or socket 17 for the reception of said strip 1. In mounting the strips in place the strip is first cemented or otherwise secured to the stile 13 and the molding 16 then positioned in place.

The sealing action of said header strip 1 is also clearly disclosed in Figure 4. When the window panel 18 is elevated in contact with said strip, its upper edge, which is wider than the slot 9, engages the tapered ledges 10 adjacent the slot 9. Further elevation of the panel compresses the ledges 10 into the channel 5 and exerts a tension on the outer surface of the strip, which pulls the sides 3 of the same slightly away from the walls of the groove 17, and the front surface 4 of the strip into sealing engagement with the side surfaces of the panel 18 adjacent its upper edge. The tension exerted by the elevation of the panel is transmitted over the surface of the strip due to the surface skin of the sponge rubber. The curved front surface 4 of the strip permits said surface to be more readily drawn into engagement with the edge of the panel, thus providing a stronger seal. The presence of the groove 5 increases the cushioning effect and permits effective sealing with a minimum of pressure between the panel and strip.

The cushioning and sealing strip shown in Figures 3 and 4 is similar to that in Figures 1 and 2 except that a relatively thick layer 20 of hard rubber is vulcanized to the back surface 2 of the strip to provide a proper surface for cementing the strip in place and to give greater rigidity to the strip to facilitate its handling during installation.

In the modification shown in Figures 4 and 5 the side surfaces 30 of the strip 1 are given an outward inclination from the back 2 to the front 4 of the strip to form projections 31 on the front of the strip. When the strip is secured in place, said projections 31 will engage the walls of the groove in which the strip is secured and compress the front surface 4 of the strip so that a relatively harder surface contacts the edge of the glass panel when the same is elevated into contact with said strip.

The surface 2 of this strip is backed by vulcanizing thereto a thin layer 32 of a suitable fibrous material, to which in turn is vulcanized a thicker layer 33 of hard rubber. Said backing layers 32 and 33 extend laterally beyond the sides of the surface 2 of the strip to form projections 34 of unequal length. A metal plate or strip 35 protects said backing layers 32 and 33 and is secured over said layers by having the side edges 36 bent to embrace said projections 34.

This strip is secured in place by slidably mounting the projections 34 and the sides 36 enclosing said projections in a suitably formed groove provided for that purpose.

It can thus be appreciated that I have provided an improved cushioning and sealing device which may be conveniently and readily mounted in place and which is made of such material and so constructed as to provide a weather tight joint between the two members with which it is used with a minimum requirement of pressure.

While I have disclosed my improved header strip in conjunction with the upper stile of a window frame of a vehicle door, it will be understood that it is not so limited in its application. As stated, said device may be used wherever it is desired to seal the joint between a pair of mating surfaces or may be employed as the guides or runways for the side edges of a movable vehicle panel; similarly the same may be employed as a weather strip for any type of sliding door; likewise, if desired, the same may be conveniently used as a packing gasket on a pivoted or slip container cover.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A channel strip for sealing and buffing the upper edge of a slidable vehicle window against its frame comprising an elongated molded strip of sponge rubber having a surface skin, said strip having a plane back surface and a rounded front surface, a thin fibrous layer secured to said back surface, a layer of hard rubber vulcanized thereto, said strip having a longitudinal slot therein of such configuration as to provide said front surface with a thin wall portion over said channel adapted to be depressed into said channel by said panel whereby when said panel is elevated against said strip it depresses and compresses said thin front wall portion in said channel thereby causing a tension to be exerted on the surface skin of one strip which draws the front of said strip into sealing engagement with the side edges of said panel.

2. A channel strip for sealing and buffing the upper edge of a slidable vehicle window against its frame, comprising an elongated folded strip of sponge rubber having a surface skin, said strip having a plane back surface and a rounded front surface, a thin fibrous layer secured to said back surface, a layer of hard rubber vulcanized thereto, said layers having edges projecting beyond the side of said back surface, a middle reinforcing plate having its sides turned over said projection, said strip having a longitudinal slot therein of such configuration as to provide said slot surface with a thin wall portion over said channel adapted to be depressed into said channel by said panel whereby once said panel is elevated against the said strip it depresses and compresses said thin front wall portion into said channel thereby causing a tension to be exerted on the surface skin of the strip which draws the front of said strip into sealing engagement with the side edges of said panel.

In testimony whereof I have hereunto subscribed my name at Chicago, Cook County, Illinois.

REES BEYNON.